United States Patent [19]

Garrec

[11] Patent Number: 5,219,410
[45] Date of Patent: Jun. 15, 1993

[54] DEVICE FOR TRANSMITTING MOVEMENT BETWEEN A SOLID AND A MEMBER, IN PARTICULAR FOR A ROBOT ABLE TO BE MOVED ON LEGS

[75] Inventor: Philippe Garrec, Verrieres-le-Buisson, France

[73] Assignee: Commissariat a l'Energie Atomique, Paris, France

[21] Appl. No.: 886,296

[22] Filed: May 21, 1992

Related U.S. Application Data

[63] Continuation of Ser. No. 601,253, Oct. 19, 1990, abandoned.

[30] Foreign Application Priority Data

Oct. 20, 1989 [FR] France .............................. 89-13775

[51] Int. Cl.⁵ .................................... B62D 57/02
[52] U.S. Cl. ............................ 180/8.1; 180/8.6
[58] Field of Search ........................... 180/8.1, 8.6

[56] References Cited

U.S. PATENT DOCUMENTS

| | | | |
|---|---|---|---|
| 2,292,298 | 8/1942 | Singer | 180/8.6 |
| 2,491,064 | 12/1949 | Urschel | 180/8.6 |
| 3,002,578 | 10/1961 | Kraüs | 180/8.1 |
| 4,511,011 | 4/1985 | Bartholet | 180/8.6 |
| 4,558,758 | 12/1985 | Littman et al. | 180/8.6 |
| 4,738,583 | 4/1988 | Macconochie et al. | 180/8.6 |
| 5,005,658 | 4/1991 | Bares et al. | 180/8.1 |

FOREIGN PATENT DOCUMENTS

| | | | |
|---|---|---|---|
| 659809 | 7/1929 | France . | |
| 38865 | 8/1931 | France . | |
| 816702 | 8/1937 | France . | |
| 37364 | 3/1977 | Japan | 180/8.6 |
| 36867 | 4/1978 | Japan | 180/8.1 |
| 205567 | 9/1986 | Japan | 180/8.6 |
| 251284 | 11/1987 | Japan | 180/8.1 |
| 3580 | 1/1990 | Japan | 180/8.6 |

OTHER PUBLICATIONS

Marvin Russell, Jr.; "Odex 1: The First Functionoid"; Robotics Age Sep.-Oct. 1983 No. 5 pp. 12-18.
E. A. Dijksman; "Kempe's Linkages and Their Derivations"; Journal of Engineering for Industry vol. 97, No. 3 Aug. 1975; pp. 801 to 806.
H. G. Conway; "Straight-Line"; Machine Design vol. 22, Jan. 1950 pp. 90 to 92.

*Primary Examiner*—Mitchell J. Hill

[57] ABSTRACT

The present invention relates to a device for the relative movement between a solid (S) and a member (T) which can be used in particular for a robot able to be moved on legs. The transmission system is exclusively composed of bars joined together at at least two points (1,3) to the solid and at two points (2, 12) to the member (T). A principal system (X) may be distinguished as a system with a degree of freedom and constituted in such a way that one circular movement of a member (M) driven by a motor is expressed by a horizontal rectilinear movement of one point (2) linked to the member, as well as an additional system (R4, R5, R6) which follows the movements of the previous system and which is also connected to the solid and the member so as to keep this member vertical.

15 Claims, 6 Drawing Sheets

DEVICE FOR TRANSMITTING MOVEMENT BETWEEN A SOLID AND A MEMBER, IN PARTICULAR FOR A ROBOT ABLE TO BE MOVED ON LEGS

This application is a continuation of application Ser. No. 07/601,253, filed Oct. 19, 1990 now abandoned.

FIELD OF THE INVENTION

The invention concerns a relative displacement device which includes in particular articulated bar transmissions, as well as a vehicle equipped with such devices between a central body and support lengthening pieces on the ground.

BACKGROUND OF THE INVENTION

The invention concerns in particular these generally robotized vehicles whose central body is elevated and whose support on the ground is effected by vertical legs. During locomotion, the legs are alternately raised and lowered so that the vehicle remains constantly in support on certain legs. Moving forward is effected by deforming the transmissions of the legs so as to move the central body and the raised legs with respect to the legs connected to these deforming transmissions. Contrary to the case with the majority of vehicles, the legs in contact with the ground do not move on the latter by rolling or sliding.

The transmissions have a geometrical constitution allowing for converting a circular movement produced by a motor into a horizontal rectilinear leg movement, the periodic raising and lowering of the legs being effected by other means.

There are various transmissions to convert a circular movement into a varying movement or vice versa. Many of these present drawbacks, especially as regards their mechanical efficiency. The ones which have been retained to form part of the invention exclusively use interjoined bars. It ought to be mentioned that several transmissions integrated in the invention and having as one characteristic feature a degree of freedom are already known, the trajectory of one of the points being a circle and the trajectory of another point being a straight line.

Generally speaking, the transmission includes a main system of interjoined bars and including a first point joined to the solid, a second point joined to the member, a crank forming part of the bars and joined to the solid at a third point and to the other bars at a fourth point, this crank having a length equal to the distance between the first and third points so that a movement for rotating the crank around the third point is expressed by a rectilinear movement of the second point.

The main system is completed by an additional system of bars joined to the solid at a fifth point and to the member at a sixth point; the additional system is constituted in such a way as to have an identical chain of bars between the sixth and fifth points identical at a nearby translation to a chain of bars of the main system between the second point and a seventh point where the main system is joined to the solid; this seventh point shall generally be merged with the first or the third point. Finally, linking bars are disposed between the two systems so that both the systems have a degree of freedom and the two chains of bars deform identically. In accordance with the invention, the transmission is completed by a motor system ending at the third point and adapted so as to have the crank rotate around this point. The transmission may thus be driven with a small amount of energy and the original forces of the second joint and perpendicular to its displacement, such as the support reactions of the member on the ground, do not provoke any torque on the motor, the latter thus able to be a lower-powered motor.

The linking bars often include stanchions parallel to a straight line passing through the second and sixth points and which each extend between one joint of the bar chain of the main system and one joint of the bar chain of the additional system and are joined to the chains of bars with these joints. A stanchion then frequently ends at the fourth point.

Another simple conception is one where the two systems are identical.

The invention also concerns a vehicle including a central body and legs resting on the ground and also provided with the transmissions defined as previously with each of these transmissions uniting the central body to a respective leg. The central body and the leg is equivalent to the solid and to the member or vice versa. The transmissions are disposed in such a way that the second points are moved parallel to the ground. Furthermore, the legs may be raised from the ground by elevating means.

BRIEF DESCRIPTION OF THE DRAWINGS

There now follows a description of the invention with the aid of the following figures, given by way of illustration and being in no way restrictive.

DETAILED DESCRIPTION OF THE PREFERRED EMBODIMENTS

Figure 1:
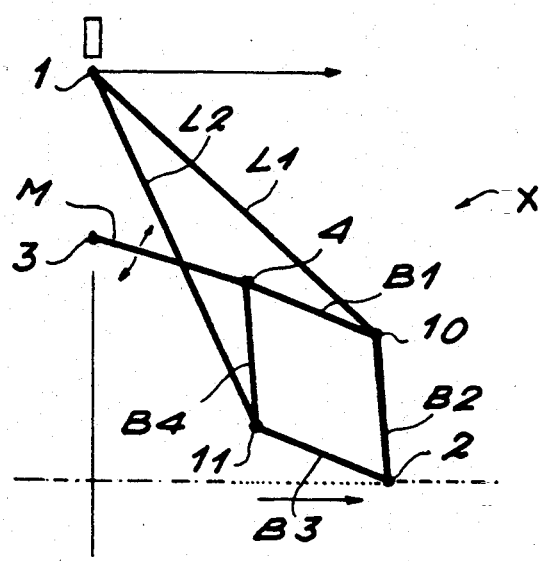
FIG. 1 illustrates a first embodiment of an articulated system to convert a circular movement into a varying movement.

FIG. 1 shows an articulated bar system generally given the reference X and invented by the General "Peaucellier" in the last century. Four points of the system are referenced 1 to 4. Four bars B1 to B4 of equal length are joined together so as to constitute a deformable rhombus or diamond whose points 2 and 4 have opposing apexes, the other apexes of the rhombus bearing the references 10 and 11. The system further includes two bars L1 and L2 of the same length and longer than the bars B1 to B4 of the rhombus, the first bar L1 connecting the point 1 to the point 10 and the second L2 the point 1 to the point 11. Finally, a bar M known as a crank connects the points 3 and 4.

All the bars are joined at their extremities and situated approximately inside a plane, that is that they are normally only offset with respect to one another perpendicular to this plane by a distance enabling them to avoid being in contact with one another. The points 1 to 4 and 10 and 11 physically correspond to axes with a small length. In addition, the crank M has a length equal to the distance between the points 1 and 3.

By keeping the points 1 and 3 immobile and by communicating to the crank M a movement rotating around the point 3 which moves the point 4 onto a circle passing through the point 1, the point 2 is moved along a straight line perpendicular to the straight line connecting the points 1 and 3 and whose distance from these points depends on the lengths of the bars. In mathematical terms, the system X carries out an inversion between the trajectories described by the points 4 and 2 with respect to the pole constituted by the point 1.

Figure 2:
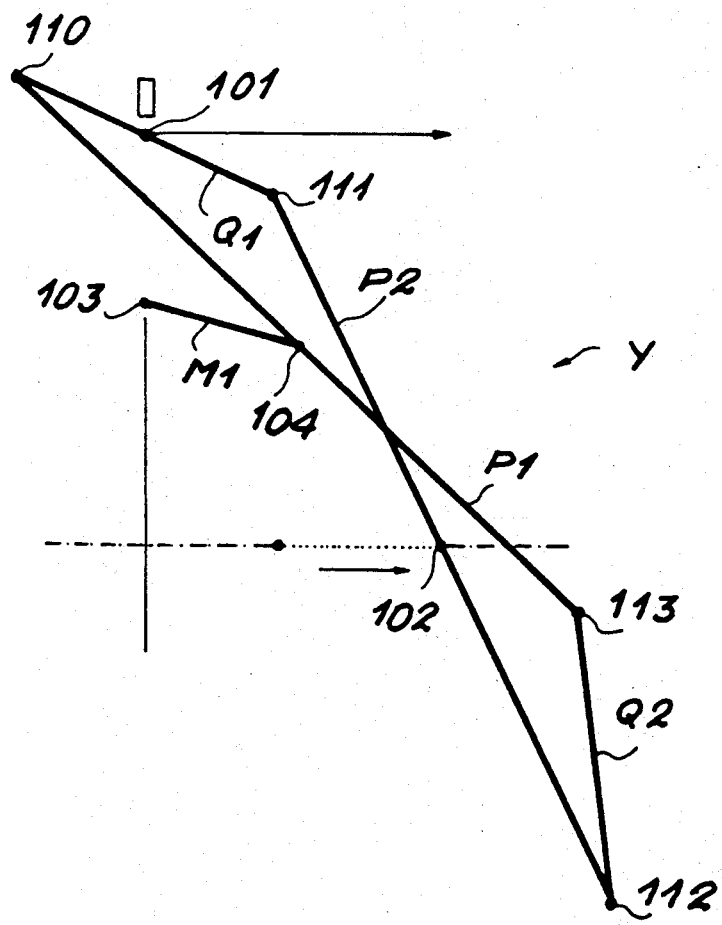
FIG. 2 illustrates a second embodiment of an articulated system to convert a circular movement into a varying movement.

A similar system was conceived by Hart shortly after the previous system. This system is referenced by Y on FIG. 2 and four points of the system are given the references 101 to 104 with characteristic features equivalent to those of the points 1 to 4 of the preceding system X. A crank M is articulated between the points 103 and 104 and whose length is equal to the distance between the points 101 and 103. There are four bars joined together at four points 110 to 113 so as to form a counterparallelogram, (i.e., a shape consisting of two sets of opposite pairs of sides of equal length, where the pair of sides of one set intersect each other) but two sides of the counterparallelogram corresponds to the diagonals of the counterparallelogram which would pass through these points. The bars of the same length are referenced by P1 (articulated between the points 110 and 113) and P2 (articulated between 111 and 112) and which coincide with these two sides, whereas the other two sides of the counterparallelogram physically correspond to bars referenced Q1 (articulated between 110 and 111) and Q2 (articulated between 112 and 113), the bars Q1 and Q2 also being of the same length.

The points 101, 102 and 104 are at the center of the bars Q1, P2 and P1 respectively. If a rotation is communicated to the crank M1 around the point 103, the point 104 is moved along a circle and the point 102 along a straight line perpendicular to the line passing between the points 101 and 103.

Figure 3:
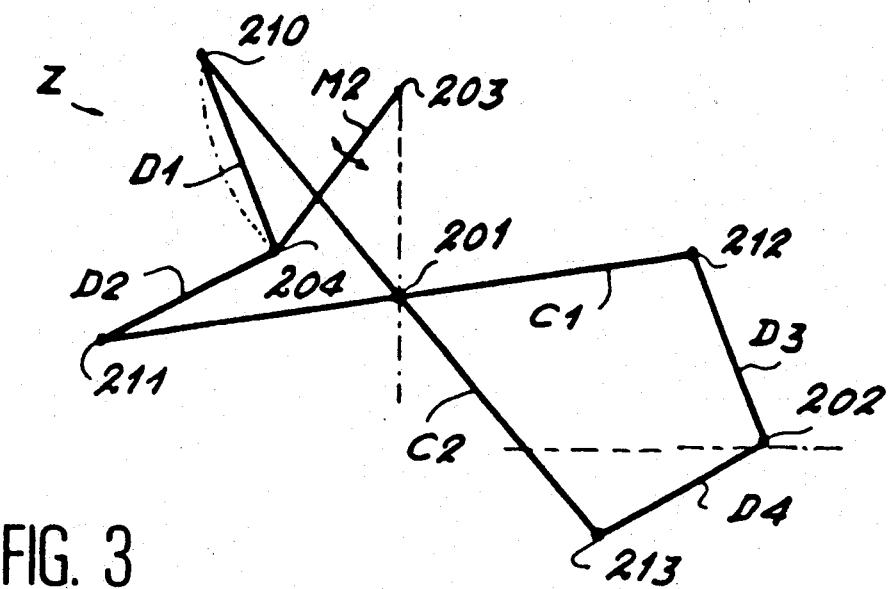
FIG. 3 illustrates a third embodiment of an articulated system to convert a circular movement into a varying movement.

The Hart system is simpler than that of Peaucellier as it uses less bars, but it is more spatially demanding as the bars are longer for identical travels of the point moved over a straight line. The inventor has proposed a third system Z (FIG. 3) where it is possible to define four points 201 to 204 with characteristic features identical to those of the points 1 to 4 respectively, as well as four additional points 210 to 213. In addition, the system is composed of a crank M2 articulated between the points 203 and 204 and with a length equal to the distance between the points 201 and 203, two crossed bars C1 and C2 of the same length and joined together at their center (which corresponds to the point 201), and four bars D1 to D4 all of the same length and disposed in two pairs. The bars D1 to D4 are respectively articulated between the points 210 and 204, 204 and 211, 212 and 202, and 202 and 213. In addition, the bar C1 extends between the points 211 and 212 and the bar C2 between the points 210 and 213. Furthermore, the bars D1 and D3 are parallel to each other, the same applying to the bars D2 and D4.

A circular movement of the point 204 around the point 203 corresponds to a to-and-fro movement along a straight line of the point 202.

Figure 4:
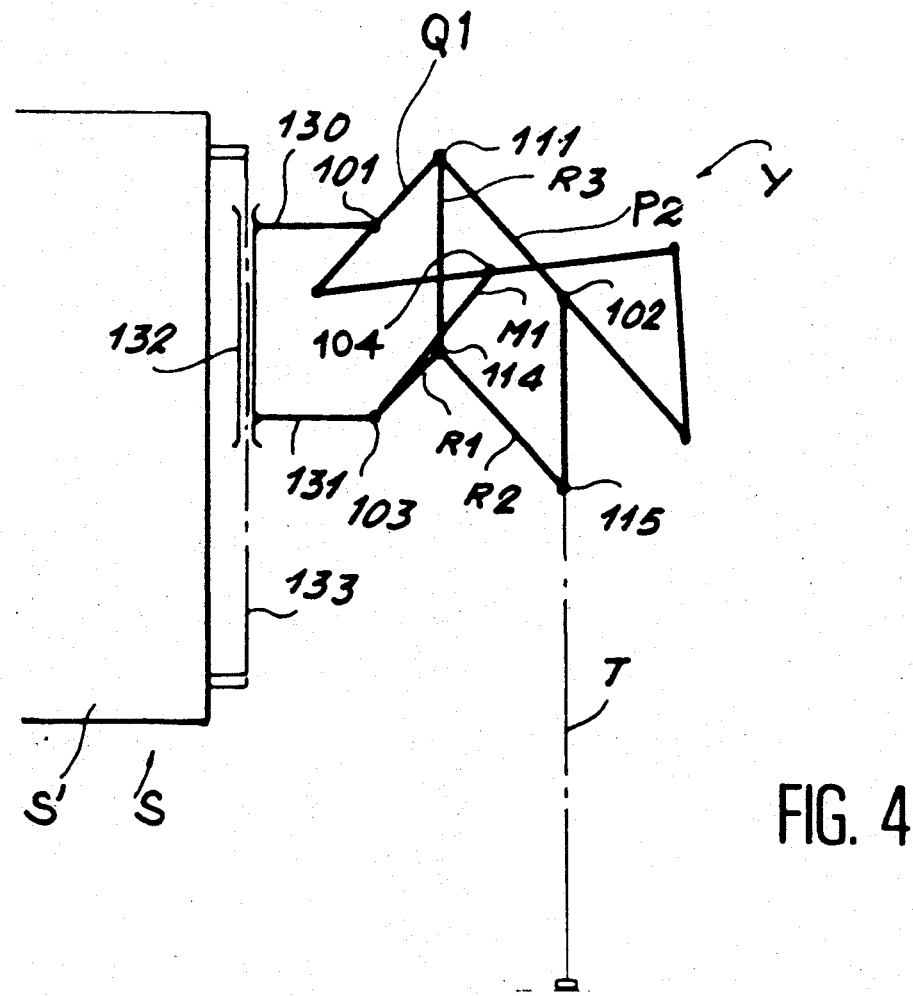
FIG. 4 illustrates a first embodiment of a complete transmission.
Figure 10:
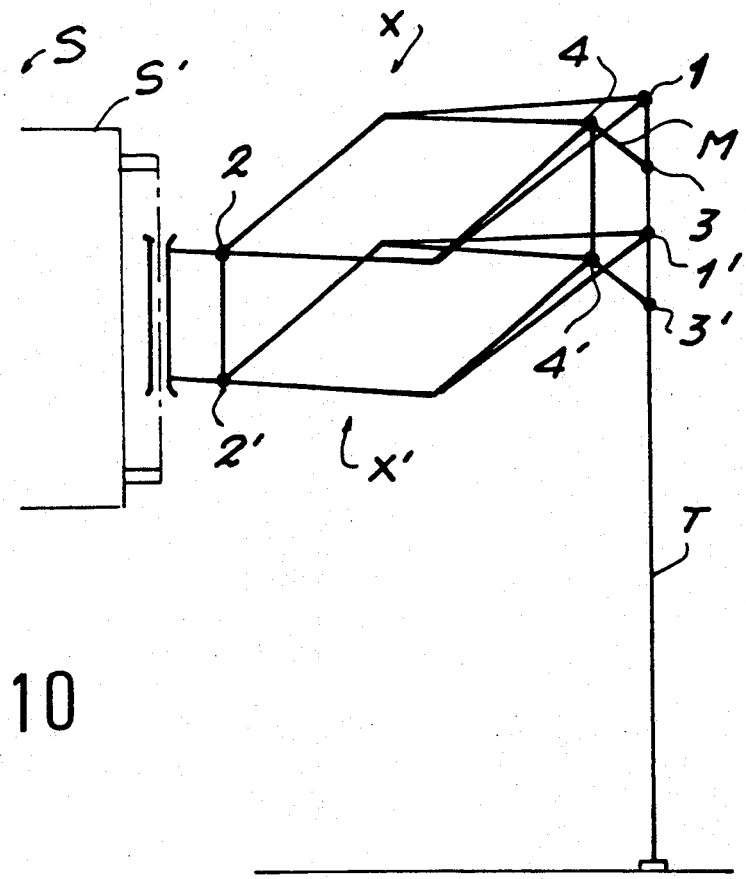
FIG. 10 illustrates a different embodiment than FIG. 8 of a vehicle configuration equipped with transmissions as described in FIGS. 4-7.

FIG. 4 represents an example for adapting such systems to a transmission between a solid, such as the central body of a robotized vehicle and a member constituting a leg T for support on the ground. The seven points are the first point (101), the second point (102), the third point (103), the fourth point (104), the fifth point (103), the sixth point (115) and the seventh point (101) in FIG. 4. The seven points are numbered 1, 2, 3, 4, 1' (or 3'), 2' and 1 (or 3) in FIGS. 5 and 10. The seven points are numbered 201, 202, 203, 204, 1, 2 and 201 in FIG. 6. The seven points are numbered 1, 2, 3, 4, 12 and 1 is FIG. 7. In FIG. 1, the apexes are 2, 4, 10 and 11. The point 102 of the Hart system Y is joined to the leg T and the point 101, just like the point 103, to the central body S. However, it is essential to provide an additional system so as to prevent the leg T tilting over. This is why two additional bars R1 and R2 are joined together at a point 114 and respectively to the point 103 and at a point 115 of the leg T. The bars R1 and R2 form a chain parallel to another bar chain belonging to the Hart system Y, namely the bar Q1 between the points 101 and 111 and the bar P2 between the points 111 and 102. In addition, an additional third bar R3 is articulated between the points 11 and 114.

The resultant system thus always has one degree of freedom; when the crank M1 is turned, the points 102 and 115 move along horizontal translations with the same width. The leg T does not therefore undergo any rotation.

Figure 9:
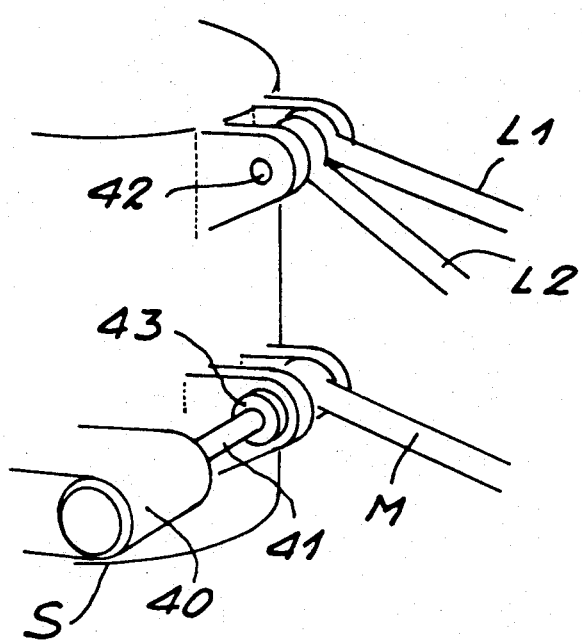
FIG. 9 illustrates a disposition for driving a transmission.

The movement of the crank M1 may be provoked by an electric motor (not shown) whose shaft coincides with the hinge point 103 and extends perpendicular to the plane of the bars of the transmission. As indicated earlier, this motor may be a low-powered motor as the weight of the central body S is not expressed by a torque component around the point 103. FIG. 9 shows this disposition for the system of FIG. 1. The motor 40 for driving the transmission is fixed to the solid S. Its rotating shaft 41 is a single-piece with the crank M. The bars L1 and L2 are joined onto an immobile spindle 42 borne by the solid S by means of bearings (not shown). The rotating shaft 41 is supported by a bearing 43 housed in a recess of the solid S.

The points 101 and 103 are situated at the extremities of two horizontal longitudinal members 130 and 131 whose other extremities are fixed to a bearing 132 able to move along a vertical slide 133 secured to a core S' which constitutes the main part of the central body S. Systems, such as a jack or step motor gearing with a rack are able to lift the leg T by making the bearing 132 slide vertically or orientate the leg T with respect to the core S' by making the bearing 132 rotate.

Figure 5:
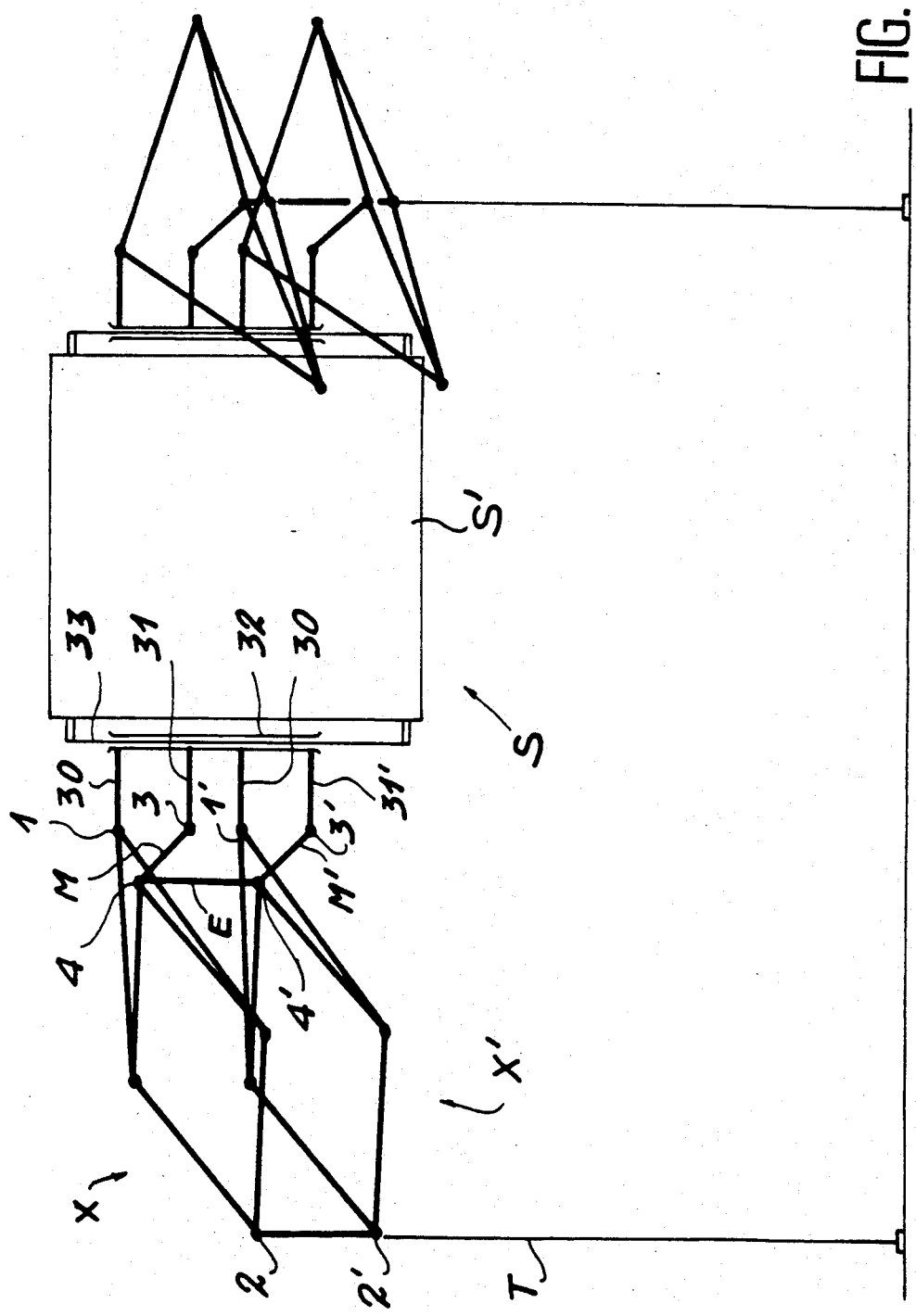
FIG. 5 illustrates a second embodiment of a complete transmission.

FIG. 5 shows another satisfactory solution which consists of superimposing two reversor systems, namely in this case two identical Peaucellier systems referenced X and X' able to be superimposed by a single vertical transmission. The leg T is joined to the systems X and X' at two points 2 and 2', the central body S at four points 1, 3, 1' and 3'. One of the cranks, in this instance M' belonging to the lower system X', is motorized. It is thus necessary to provide a synchronization bar E between the two systems X and X', which is, for example, joined to the end points 4 and 4' of the cranks M and M' but may also be joined to two similar location points each belonging to a system X or X'. The distance between the two systems X and X' may be arbitrary, but it is subsequently possible to select it so that the points 3 and 1' are merged, which simplifies the transmission.

The points 1, 3, 1' and 3' are connected by four parallel longitudinal members 30, 31, 30' and 31' to a bearing 32 sliding in the same conditions as for FIG. 4 in a vertical slide 33 rigidly connected to the body S.

The left part of FIG. 5 represents the transmission extended to the maximum and the right part of the same transmission in the state where it is most compact.

Figure 6:
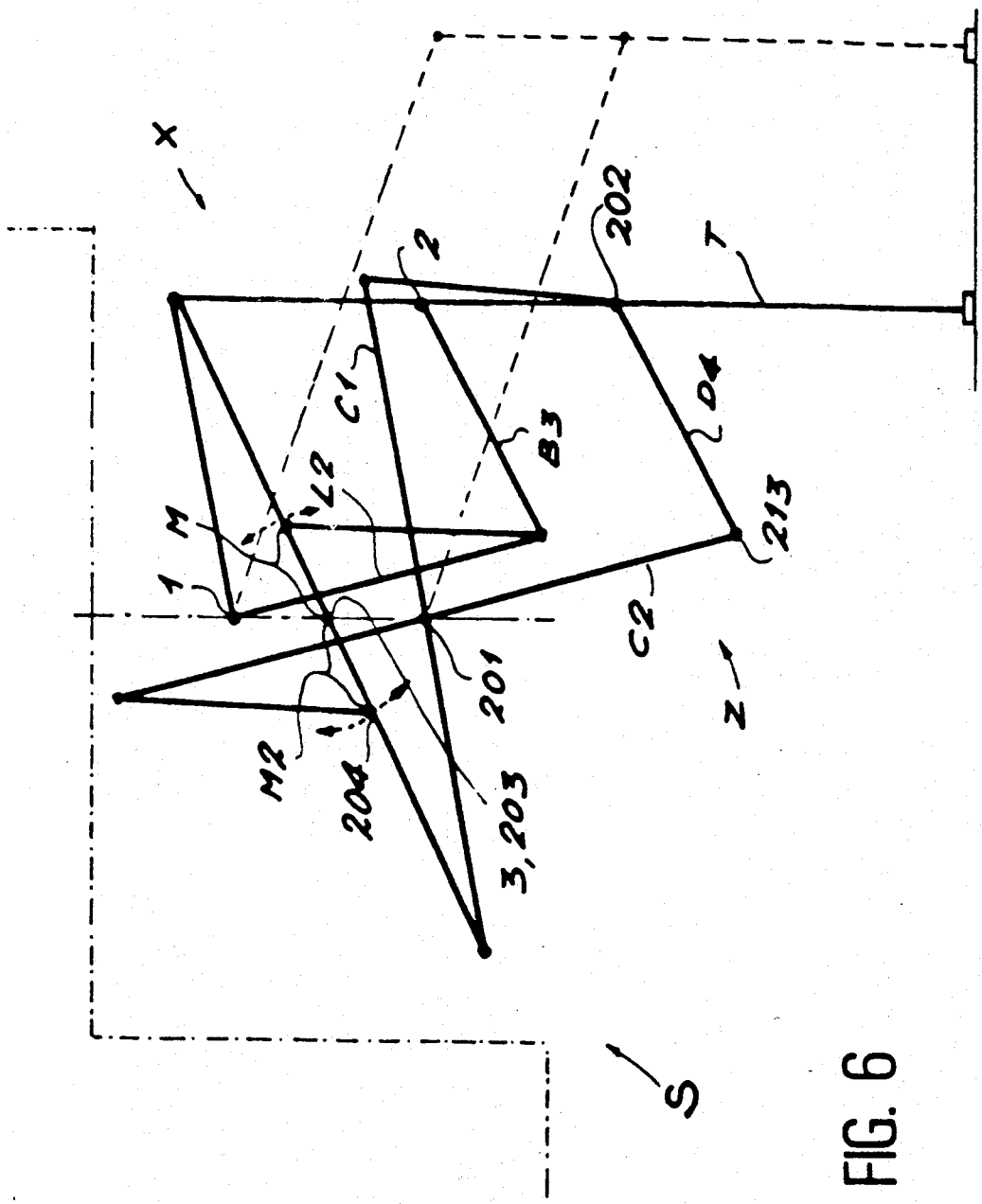
FIG. 6 illustrates a third embodiment of a complete transmission.

FIG. 6 shows a more complicated combination case as, in order to constitute the transmission, a Peaucellier X system and a third system Z have been superimposed. The leg T is joined to the points 2 and 202 and the central body S to the points 1, 3, 201 and 203. However, the points 3 and 203 are merged in this embodiment and the cranks M and M2 in fact constitute two opposing sections with respect to the hinge point 3 or 203 of a given rectilinear crank. The single link between the two systems X and Z thus resides in this common crank and there are no additional linking bars. One geometrical condition to be fulfilled is that the bars B3 and L2 of the Peaucellier system X are respectively of the same length as the bar D4 and the section of the bar C2 between the points 201 and 213 of the third system Z.

Figure 7:
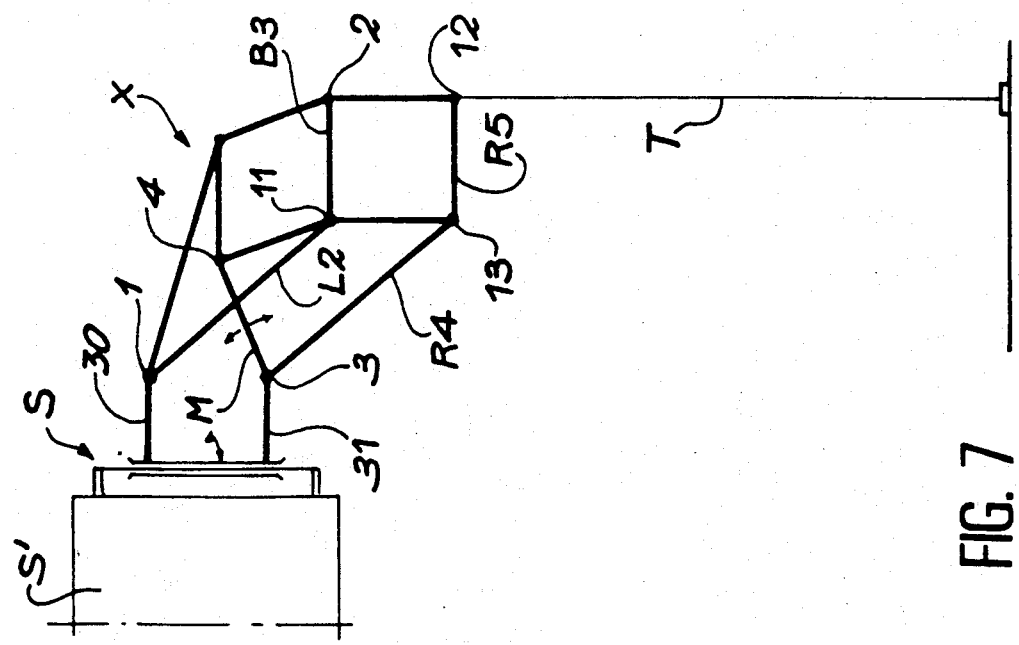
FIG. 7 illustrates a fourth embodiment of a complete transmission.

FIG. 7 shows an advantageous variant as it has a reduced number of bars and thus makes it possible to simplify without modifying the extent of the travel of the leg T. This transmission is made up of a Peaucellier system X and three additional bars R4, R5 and R6 respectively joined at the points 3 and 13, 13 and 12 and 13 and 11. The point 12 is joined to the leg T. The bars R4, R5 and R6 have lengths respectively equal to those of the bar L2, the bar B3 and equal to the distance between the joints 2 and 12. As a result, the bars R4 and R5 are respectively parallel to the bars L2 and B3.

Figure 8:
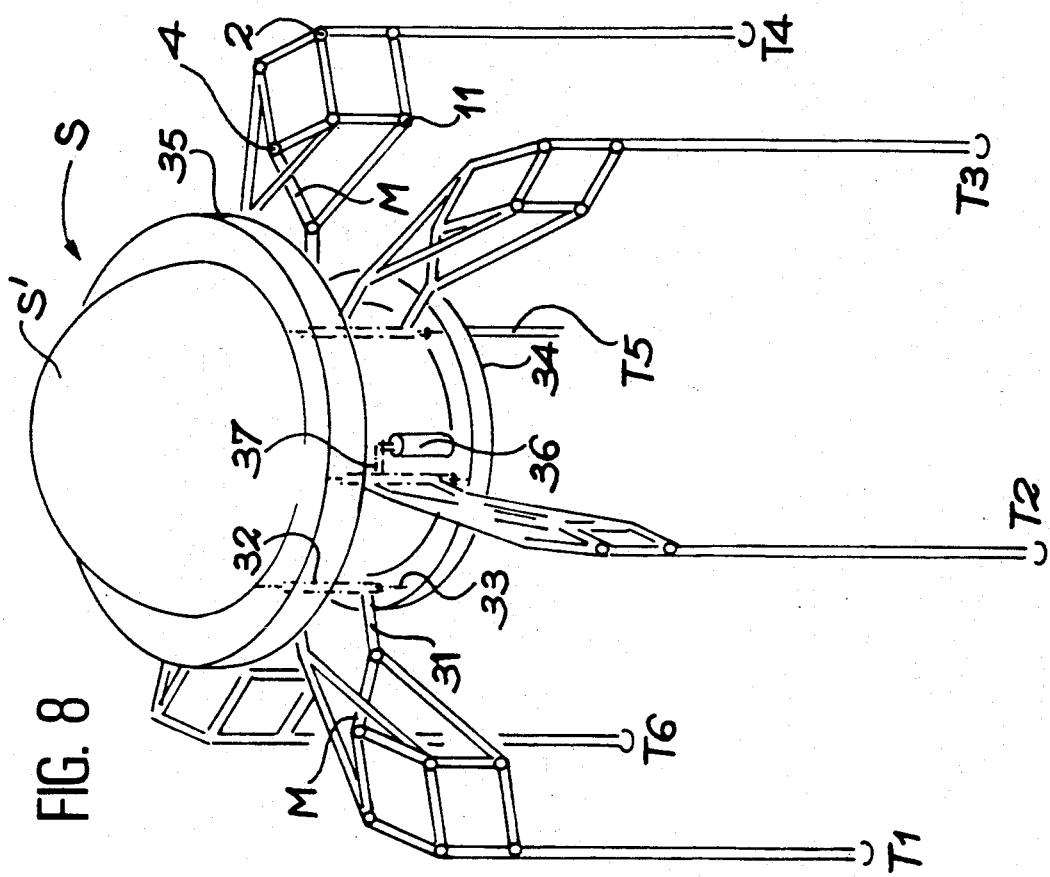
FIG. 8 illustrates a vehicle configuration equipped with such transmission as described in FIGS. 4-7.

Transmissions of this type each connect the legs T1 to T6 of a hexapod robot shown on FIG. 8 to a single central body S allowing for a relative extension of these legs with respect to this body. For each leg T1 to T6, the slide 33 of the bearing 32 is embedded at its extremities in two horizontal annular platforms 34 and 35 of the central body S. The cylinder of a jack 36 is secured to the lower platform 34 and its rod is rigidly connected to the bearing 32 by a bracket 37. The vertical movements of the rod of the jack 36 lift and lower the corresponding leg. Rotations of the bearing 32 allow for a swivelling of the plane of the leg around the axis of this bearing. The movement of the robot is effected by alternately lifting two groups of three legs, for example T1, T2 and T5 firstly and secondly T3, T4 and T6. Thus, so as to move in the direction of the leg T5, the legs T3, T4 and T6 are lifted, after which the transmission connected to the leg T5 is contracted and those which are connected to the legs T1 and T2 are extended; the rotations are simultaneously controlled: the central body S is thus moved. Then the legs T3, T4 and T6 are lowered and the legs T1, T2 and T5 are lifted up whose transmissions undergo movements opposite the previous ones.

Furthermore, the rotations of the cranks may be in alternate directions or along a continuous movement, depending on the nature of the transmission.

Upon reading of the preceding description, it is clear that other embodiments are possible without departing from the context of the invention. This is why the positions of the leg T and the central body may be inversed, as shown on FIG. 10. The transmission is formed of two Peaucellier systems X and X', as shown on FIG. 5. The points 1, 1', 3 and 3' are secured to the leg T, the points 2 and 2' to the central body S. The drive motor (not shown) which drives the crank M is placed on the leg T. The advantage of this inversion is that the joined bars slightly pass outside the leg T when this leg is near the central body S; the spatial requirement of the vehicle is thus reduced. For certain porportions of bar lengths, it is even possible that they do not have to pass outside the leg at all.

What is claimed is:

1. Device for transmitting movement between a solid (S) and a member (T) comprising a network of articulated bars composed of: a first system of bars (X,Y,Z) joined together, joined to the solid at a first point (1; 101; 201) and to the member at a second point (2; 102; 202), the bars of the first system comprising a crank (M; M1; M2) joined to the solid at a third point (3; 103; 203) which is at a constant distance from the first point and joined to at least another bar of the network at a fourth point (4; 104; 204), the crank having a length equal to said constant distance, and a set of bars (Q1, P2; L2, B3) successively articulated and extending between the second point and a seventh point where the set of bars is jointed to the solid (S); a second system of bars joined to the solid at a fifth point (103; 1'; 3'; 203; 3) and to the member at a sixth point (115; 2'; 202; 12), said second system of bars (R1, R2, R4, R5; X¹; C2, D4) being successively articulated to form a bar chain extending between the sixth and the fifth point; linking bars (R3; E; R6) between said first system and said second system and disposed so that the network has one degree of freedom and said set of bars and said second system of bars are kept at identical shapes distant by a translation; and a motor system operatively connected to the crank for rotating the crank around the third point.

2. Device according to claim 1, wherein the seventh point is merged with the first point.

3. Device according to claim 2, wherein the fifth point is merged with the third point.

4. Device according to claim 1, wherein the seventh point is merged with the third point.

5. Device according to claim 1, wherein said linking bars include stanchions parallel to a straight line passing through the second and sixth points each extending between one articulation of the set of bars and one articulation of the second system of bars and are articulated to the set of bars and the second system of bars at said articulation.

6. Device according to claim 5, wherein a stanchion ends at the fourth point.

7. Device according to claim 1, wherein the first system of bars and said second system of bars each include four bars (X,X') joined together to form a rhombus which are identical to each other.

8. Device according to claim 1, wherein the first system of bars (X) is comprised of the crank (M), four bars joined together to constitute a rhombus having four apexes, the second (2) and fourth (4) points corresponding to opposing apexes of the four apexes, and two bars (L1, L2) of equal length each joined to the first point (1) and respectively to the two remaining apexes (10,11) of said four apexes.

9. Device according to claim 8, wherein one bar (L2) of said two bars (L1, L2) is joined to the first point and one bar of the rhombus (B3) is joined to the second point and to the other bar of said two bar, a stanchion (E) ending at the fourth point and with the first and seventh points being merged.

10. Device according to claim 8, wherein the second system is composed of two crossed bars (C1, C2) of the same length and joined at their center to the fifth point (201), and two pairs of linking bars, each pair of linking bars being joined to each other and to another crossed bar, to the sixth point (202) for one pair and to an eight point for the other pair, one linking bar also forming a crank between the third and the eighth points.

11. Device according to claim 1, wherein the first system is composed, apart from the crank, of four bars to form a counterparallelogram having sides, the first point (101) being borne at a center of one of the sides (Q1) of the counterparallelogram, the second (102) and fourth (109) points respectively being at centers of two sides (P2, P1) of the counterparallelogram, these two sides being adjacent to the side bearing the first point.

12. Device according to claim 1, wherein the main first system is composed, apart from the crank, of two crossed bars of the same length and joined at their center to the first point, and two pairs of linking bars, the linking bars for each pair each being joined to a different crossed bar and joined together to the second point for one pair and to the fourth point for the other pair, each bar of one pair being parallel to one bar of the other pair.

13. The device of claim 1, wherein the motor system comprises a rotation shaft perpendicular to the crank.

14. A vehicle comprising a central body and a plurality of legs bearing the body and resting on the ground, elevating means for lifting each leg with respect to the ground, each leg being connected to the body by a respective device for transmitting movement of the leg relative to the body, the device comprising a network of articulated bars composed of a first system of bars (X,Y,Z) joined together, joined to the body at a first point (1; 101; 201) and to the leg at a second point (2; 102; 202), the bars of the first system comprising a crank (M; M1; M2) joined to the body at a third (3; 103; 203) which is at a constant distance from the first point and joined to at least another bar of the network at a fourth point (4; 104; 204), the crank having a length equal to said constant distance, and a set of bars (Q1, P2; L2, B3) successively articulated and extending between the second point and a seventh point where the set of bars is jointed to the body (S); a second system of bars joined to the body at a fifth point (103; 1'; 3'; 203; 3) and to the leg at a sixth point (115; 2'; 202; 12), said second system of bars (R1, R2, R4, R5; $X^1$; C2, D4) being successively articulated to form a bar chain extending between the sixth and the fifth point; linking bars (R3; E; R6) between said first system and said second system and disposed so that the network has one degree of freedom and said set of bars and said second system of bars are kept at identical shapes distant by a translation; and a motor system operatively connected to the crank for rotating the crank around the third point.

15. The vehicle of claim 14, further comprising means for coordinating movement of the plurality of legs such that the second point of each of the legs moves parallel to the ground to thereby effect movement of the vehicle.

* * * * *